United States Patent
Kupferman

(10) Patent No.: US 6,657,810 B1
(45) Date of Patent: Dec. 2, 2003

(54) DISK DRIVE EMPLOYING SEPARATE READ AND WRITE REPEATABLE RUNOUT ESTIMATED VALUES FOR A HEAD HAVING A READ ELEMENT OFFSET FROM A WRITE ELEMENT

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 314 days.

(21) Appl. No.: 09/796,837

(22) Filed: Feb. 28, 2001

(51) Int. Cl.[7] .............................................. G11B 5/596
(52) U.S. Cl. ................... 360/77.04; 360/77.08
(58) Field of Search ................ 360/77.04, 77.08, 360/77.02, 75, 31, 48, 63, 77.01, 77.07

(56) References Cited

U.S. PATENT DOCUMENTS

| | | | |
|---|---|---|---|
| 5,585,976 A | | 12/1996 | Pham |
| 5,793,559 A | | 8/1998 | Shepherd et al. |
| 5,825,578 A | | 10/1998 | Shrinkle et al. |
| 6,049,440 A | * | 4/2000 | Shu ........................ 360/77.04 |
| 6,097,565 A | | 8/2000 | Sri-Jayantha et al. |
| 6,141,175 A | | 10/2000 | Nazarian et al. |
| 6,421,197 B1 | * | 7/2002 | Abdelnour ............... 360/77.02 |
| 6,510,017 B1 | * | 1/2003 | Abdelnour ............... 360/77.04 |

* cited by examiner

Primary Examiner—Andrew L. Sniezek
(74) Attorney, Agent, or Firm—Milad G. Shara, Esq.; Howard H. Sheerin, Esq.

(57) ABSTRACT

A disk drive is disclosed comprising a disk having a plurality of tracks, each track comprising a plurality of data sectors for storing user data and a plurality of embedded servo sectors for storing servo data. The disk drive further comprises a head comprising a read element and a write element, wherein the read element is offset from the write element. The disk drive stores a plurality of read repeatable runout (RRO) estimated values and a plurality of write RRO estimated values which are introduced into a servo loop to compensate for the different RRO disturbances which manifest during read and write operations.

4 Claims, 4 Drawing Sheets

DISK DRIVE EMPLOYING SEPARATE READ AND WRITE REPEATABLE RUNOUT ESTIMATED VALUES FOR A HEAD HAVING A READ ELEMENT OFFSET FROM A WRITE ELEMENT

BACKGROUND OF THE INVENTION

1. Field of the Invention

The present invention relates to disk drives for computer systems. More particularly, the present invention relates to a disk drive employing separate read and write repeatable runout estimated values for a head having a read element offset from a write element.

2. Description of the Prior Art

FIG. 1 shows a disk 2 having an exemplary prior art disk format comprising a plurality of concentric tracks 4, where each track 4 comprises a plurality of embedded servo sectors 6. A head is actuated radially over the disk 2 in order to write and read user data along circumferential paths defined by the tracks 4. Each embedded servo sector comprises a preamble field 8 for use in synchronizing timing recovery and gain control circuitry, and a sync mark 10 for use in discerning symbol boundaries of servo data 12. At the end of each servo sector 6 are a plurality of servo bursts 14 (A, B, C, D) which are aligned at predetermined offsets from one another and which define a centerline of the track 4. As the head reads the servo bursts 14, an indication of the head's position relative to the track's centerline is derived and used by a servo control system to maintain the head along the desired circumferential path during write and read operations.

It is known to employ a repeatable runout (RRO) estimated value while servo controlling the head to compensate for the repeatable disturbance in the position error signal due, for example, to the eccentricities of the disk or imperfections in writing the embedded servo sectors 6 to the disk. The RRO estimated value is fed forward into the servo loop by subtracting it from the position error signal derived from the servo bursts 14 stored in the embedded servo wedges 6. The corrected position error signal is processed by a servo compensator which generates a control current for a voice coil motor (VCM).

Magneto-resistive (MR) heads comprise a MR read element spaced apart from an inductive write element. Due to the skew angle of the MR head relative to the concentric tracks stored on the disk, the read element may not align circumferentially with the write element. At very high recording densities (tracks-per-inch (TPI)), the radial offset between the read and write elements may range from a fraction of a track to several tracks depending on the radial position of the head. When writing data to the disk, the read element is maintained over a centerline of a "read" track while the write element writes data to a "write" track (the read and write tracks may be the same track). Due to the radial offset between the read and write elements, the data may be written along a circumferential path that is offset from the centerline of the write track. During a read operation, the read element is maintained over the circumferential path of the recorded data by introducing an offset value referred to as a "micro-jog" into the servo control loop. The micro-jog corresponds to the offset of the recorded data from the track's centerline.

Because the RRO disturbance varies with the radial location of the head, the RRO disturbance will vary between read and write operations. Thus, there is a need to compensate for the different RRO disturbances that manifest during read and write operations in disk drives employing a read element offset from a write element.

SUMMARY OF THE INVENTION

The present invention may be regarded as a disk drive comprising a disk having a plurality of tracks, each track comprising a plurality of data sectors for storing user data and a plurality of embedded servo sectors for storing servo data. The disk driver further comprises a head comprising a read element and a write element, wherein the read element is offset from the write element, the write element for writing user data to the data sectors, and the read element for reading the user data stored in the data sectors and for reading the servo data stored in the embedded servo sectors. An actuator within the disk drive actuates the head radially over the disk in response to a control signal. A position error generator responsive to the servo data read from the embedded servo sectors generates a position error signal representing a position of the read element with respect to a circumferential path along a selected one of the tracks. The disk drive stores a plurality of read repeatable runout (RRO) estimated values and a plurality of write RRO estimated values. A means is provided for combining the position error signal with the read RRO estimated values to generate a corrected position error signal during a read operation, and for combining the position error signal with the write RRO estimated values to generate the corrected position error signal during a write operation. The disk drive comprises a servo compensator, responsive to the corrected position error signal, for generating the control signal applied to the actuator.

In one embodiment, the plurality of read RRO estimated values and the plurality of write RRO estimated values are stored in the servo sectors. The plurality of servo sectors of a track comprise a first interleave and a second interleave, wherein each servo sector of the first interleave stores the write RRO estimated values corresponding to the following two servo sectors, and each servo sector of the second interleave stores the read RRO estimated values corresponding to the following two servo sectors.

The present invention may also be regarded as a disk drive comprising a disk having a plurality of tracks, each track comprising a plurality of data sectors for storing user data and a plurality of embedded servo sectors for storing servo data. The disk driver further comprises a head comprising a read element and a write element, wherein the read element is offset from the write element, the write element for writing user data to the data sectors, and the read element for reading the user data stored in the data sectors and for reading the servo data stored in the embedded servo sectors. An actuator within the disk drive actuates the head radially over the disk. The plurality of servo sectors of a track comprise a first interleave and a second interleave, wherein each servo sector of the first interleave stores write repeatable runout (RRO) estimated values corresponding to the following two servo sectors, and each servo sector of the second interleave stores read RRO estimated values corresponding to the following two servo sectors. The write RRO estimated values are used to compensate for an RRO disturbance during a write operation, and the read RRO estimated values are used to compensate for an RRO disturbance during a read operation.

DESCRIPTION OF THE PREFERRED EMBODIMENTS

Figure 2A:
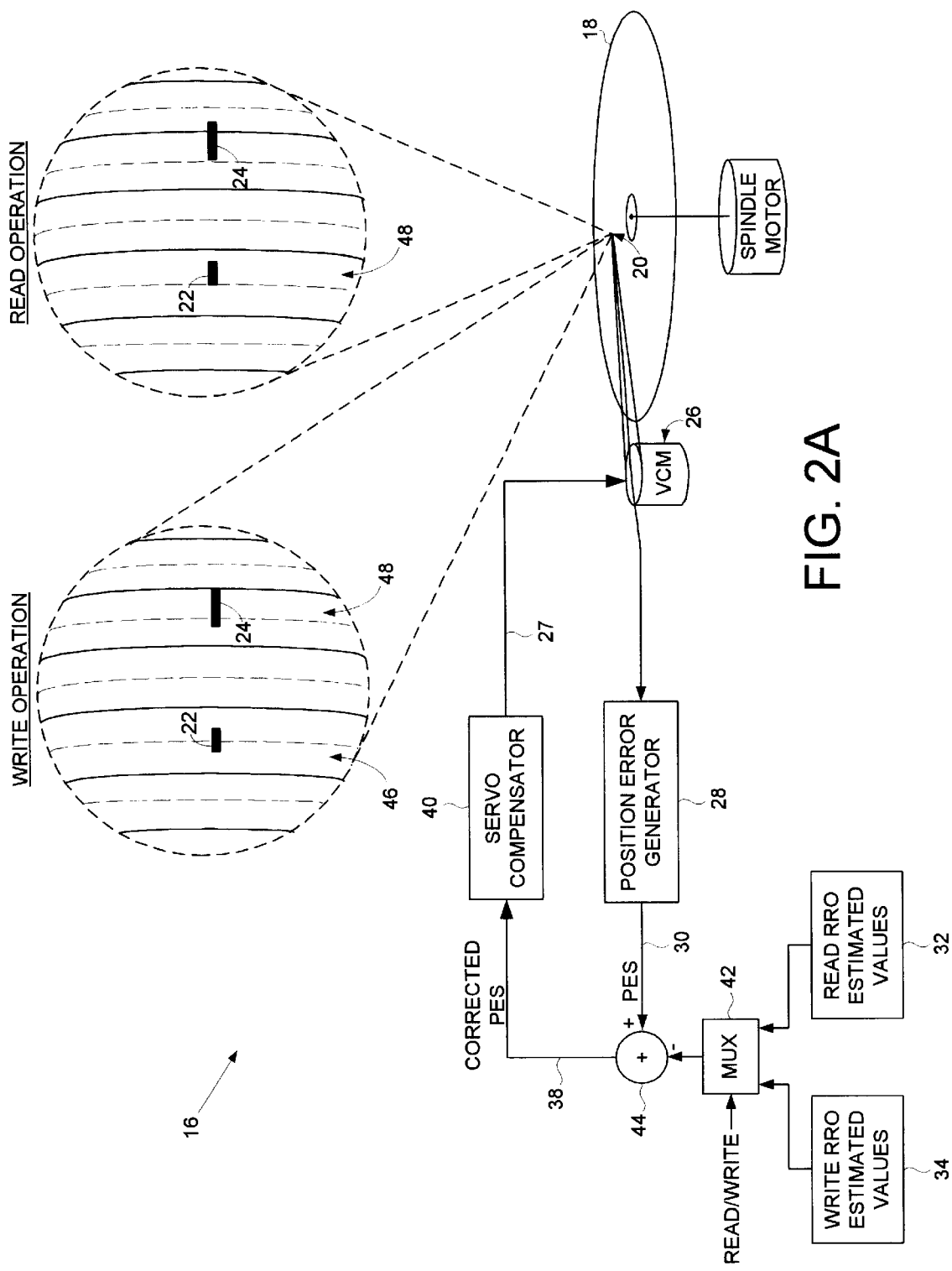
FIG. 2A shows a disk drive according to an embodiment of the present invention wherein separate read and write RRO estimated values are used to compensate for RRO disturbances during read and write operations for a read element radially offset from a write element.

FIG. 2A shows a disk drive 16 according to an embodiment of the present invention as comprising a disk 18 having a plurality of tracks, each track comprising a plurality of data sectors for storing user data and a plurality of embedded servo sectors for storing servo data. The disk drive 16 further comprises a head 20 comprising a read element 22 and a write element 24, wherein the read element 22 is offset from the write element 24, the write element 24 for writing user data to the data sectors, and the read element 22 for reading the user data stored in the data sectors and for reading the servo data stored in the embedded servo sectors. An actuator 26 within the disk drive 16 actuates the head 20 radially over the disk 18 in response to a control signal 27. A position error generator 28 responsive to the servo data read from the embedded servo sectors generates a position error signal (PES) 30 representing a position of the read element 22 with respect to a circumferential path along a selected one of the tracks. The disk drive 16 stores a plurality of read repeatable runout (RRO) estimated values 32 and a plurality of write RRO estimated values 34. A means is provided for combining the position error signal 30 with the read RRO estimated values 32 to generate a corrected position error signal 38 during a read operation, and for combining the position error signal 30 with the write RRO estimated values 34 to generate the corrected position error signal 38 during a write operation. The disk drive 16 comprises a servo compensator 40, responsive to the corrected position error signal 38, for generating the control signal 27 applied to the actuator 26.

In the embodiment of FIG. 2A, the means for combining the read/write RRO estimated values comprises a multiplexer 42 and an adder 44, wherein the multiplexer 42 selects the read or write RRO estimated values during read or write operations, and the adder 44 subtracts the RRO estimated value from the PES 30 to generate the corrected PES 38.

Figure 1:
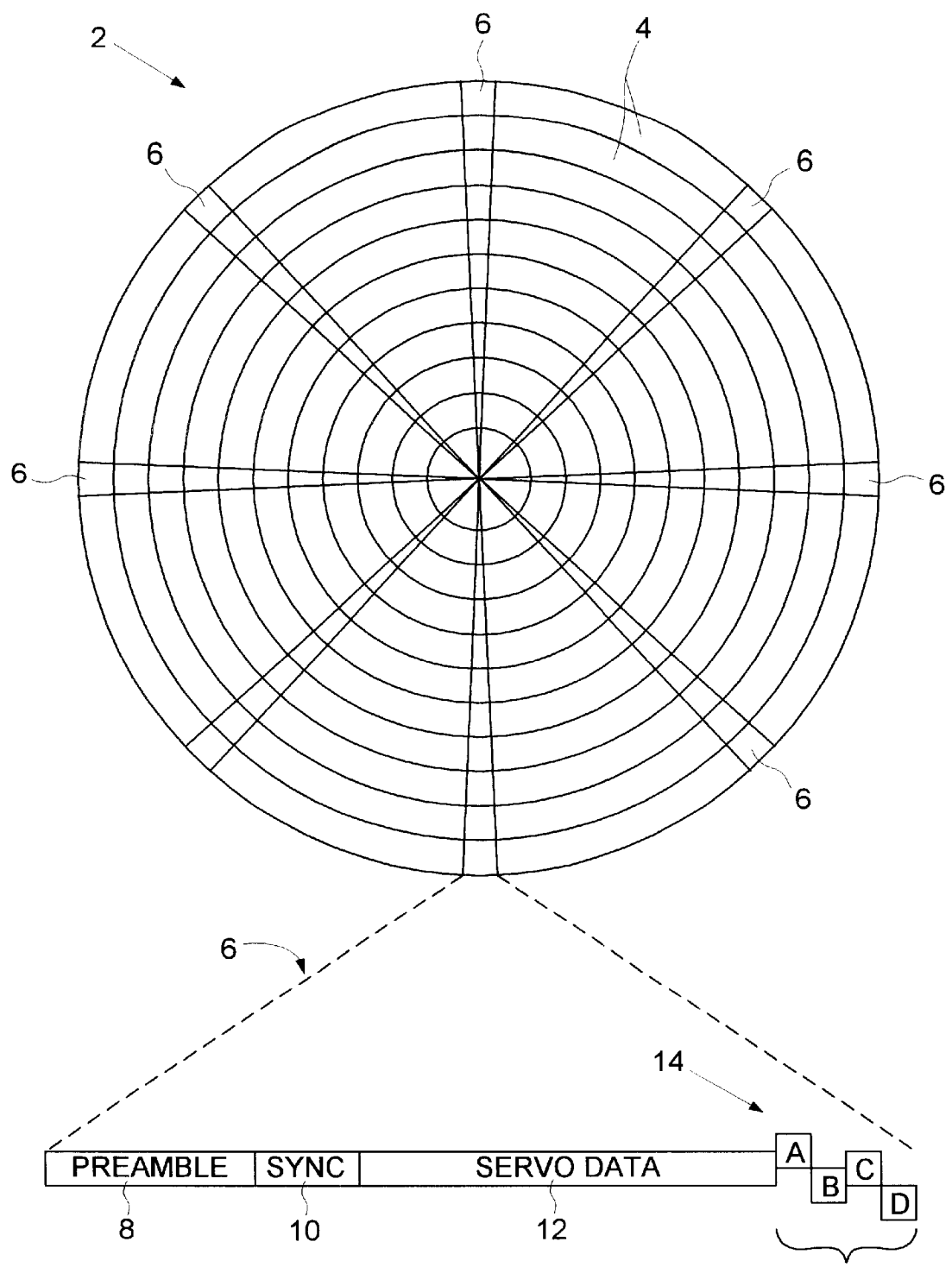
FIG. 1 is a prior art disk format comprising a plurality of concentric tracks, wherein each track comprises a plurality of embedded servo sectors having a plurality of servo bursts recorded at the end of each servo sector which define a centerline of the tracks.

In one embodiment, the servo data stored in a servo sector of a track comprises a plurality of servo bursts, wherein each servo burst is written at a predetermined offset from the track's centerline. A suitable servo burst pattern is shown in FIG. 1 comprising A, B, C and D bursts. By processing the read signal as the head 20 reads the servo bursts, the position error signal 30 is derived indicating the head's position relative to the track's centerline.

In the embodiment of FIG. 2A, during a write operation the read element 22 is positioned over a centerline of a read track 46 while the write element 24 writes data to a write track 48 along a circumferential path that is offset from the centerline of the write track 48 (the read and write tracks may be the same track depending on the radial location of the head 20). As shown in FIG. 2A, when reading the data written to track 48 the read element 22 is positioned at an offset from the track's centerline referred to as a "micro-jog" which corresponds to the offset of the recorded data from the track's centerline. Since the read element 22 is maintained over different circumferential paths of track 48 depending on whether the disk drive 16 is executing a read or write operation, the servo system will be affected by corresponding RRO disturbances. The read and write RRO estimated values 32 and 34 are used to compensate for the RRO disturbances depending on whether the disk drive is executing a read or write operation.

Figure 2B:
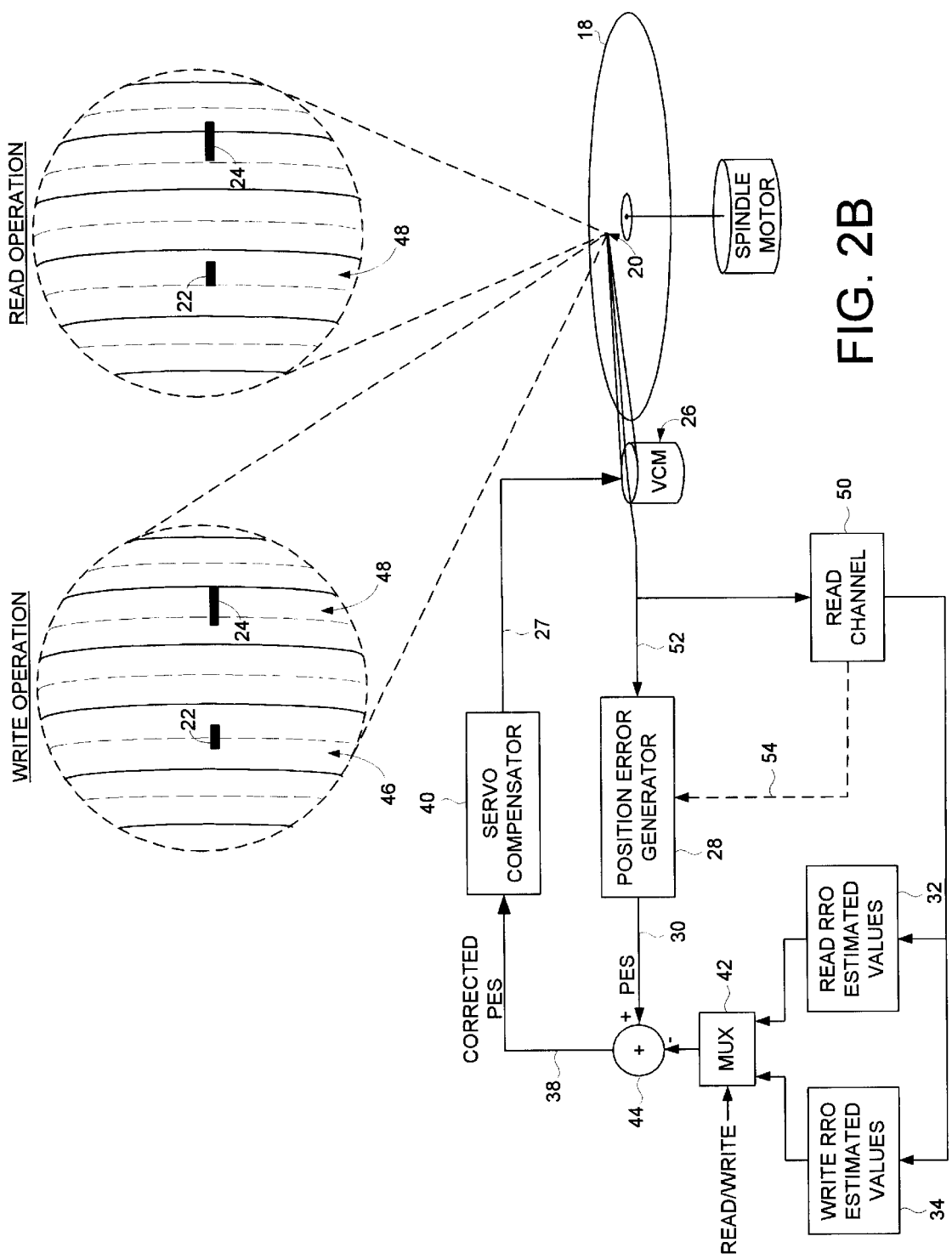
FIG. 2B shows a disk drive according to an embodiment of the present invention wherein the read and write RRO estimated values are stored in the embedded servo sectors.

FIG. 2B shows an embodiment of the present invention wherein the plurality of read RRO estimated values 32 and the plurality of write RRO estimated values 34 are stored in the servo sectors recorded on the disk 18. The RRO estimated values are calibrated during the manufacturing process and written to the servo sectors as part of the servo data. During normal operation of the disk drive, the RRO estimated values are read from the disk 18 and used to generate the corrected PES 38. In the embodiment of FIG. 2B, a suitable read channel 50 (e.g., a PRML read channel) processes the read signal 52 emanating from the head 20 to detect the RRO estimated values. In one embodiment, the read channel 52 comprises suitable circuitry for detecting the servo burst information which is transferred to the position error generator 28 over line 54.

Figure 3A:
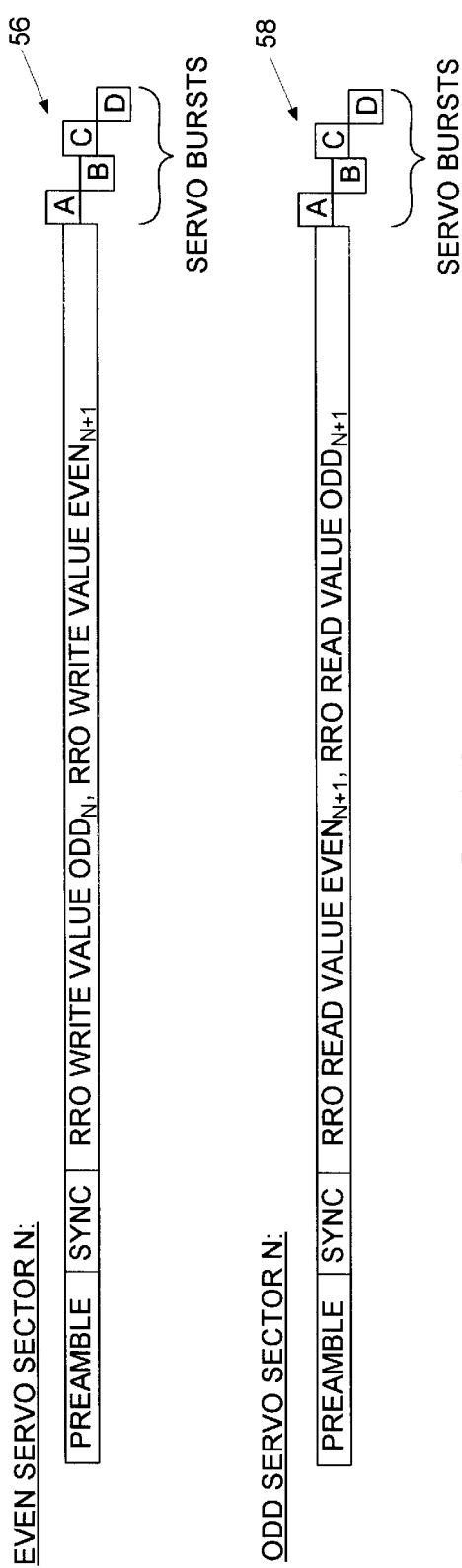
FIG. 3A shows a format of the embedded servo sectors according to an embodiment of the present invention, wherein servo sectors of a first interleave (e.g., even interleave) store the write RRO estimated values for the next two servo sectors, and servo sectors of a second interleave (e.g., an odd interleave) store the read RRO estimated values for the next two servo sectors.

In an embodiment shown in FIG. 3A, the plurality of servo sectors of a track comprise a first interleave 56 (e.g., even interleave) and a second interleave 58 (e.g., odd interleave). Each servo sector of the first interleave 56 stores the write RRO estimated values corresponding to the following two servo sectors. Each servo sector of the second interleave 48 stores the read RRO estimated values corresponding to the following two servo sectors. When the head 20 reads a servo sector in the first interleave, the write RRO estimated values for the next two servo sectors are buffered in memory, and when the head 20 reads a servo sector in the second interleave, the read RRO estimated values for the next two servo sectors are buffered in memory. When the servo compensator 40 generates the control signal 27 for a current servo sector, the RRO estimated values buffered in memory are used to generate the corrected PES 38 depending on whether the disk drive is executing a read or write operation.

Figure 3B:
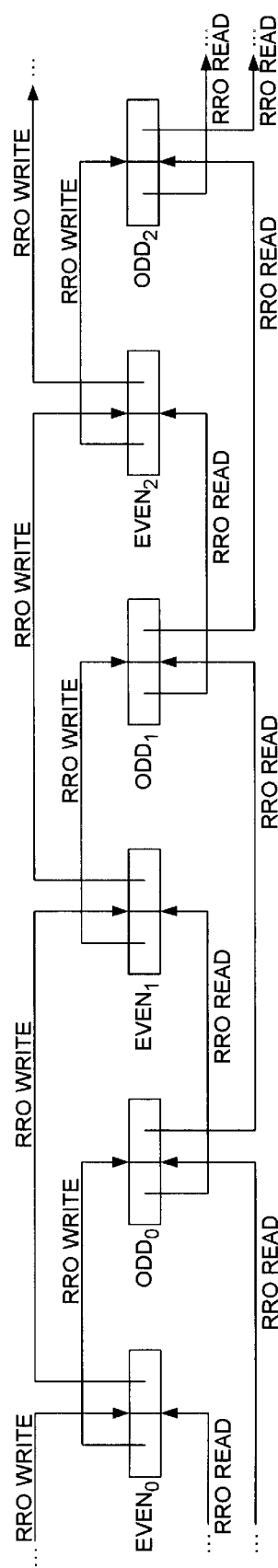
FIG. 3B further illustrates the format of the embedded servo sectors shown in FIG. 3A.

Further details of the disk format of FIG. 3A are shown in FIG. 3B. The first servo sector of the first interleave ($EVEN_0$) stores the write RRO estimated values for the next two servo sectors ($ODD_0$ and $EVEN_0$). The first servo sector of the second interleave ($ODD_0$) stores the read RRO estimated values for the next two servo sectors ($EVEN_1$ and $ODD_1$), and so on. In this manner, each servo sector has a corresponding read and write RRO estimated value. The appropriate RRO estimated value is selected based on the operation (read or write) and combined with the PES 30 for the servo sector to generate the corrected PES 38 applied to the servo compensator 40.

We claim:

1. A disk drive comprising:
   (a) a disk comprising a plurality of tracks, each track comprising a plurality of data sectors for storing user data and a plurality of embedded servo sectors for storing servo data;

(b) a head comprising a read element and a write element, wherein:
the read element is offset from the write element;
the write element for writing user data to the data sectors; and
the read element for reading the user data stored in the data sectors and for reading the servo data stored in the embedded servo sectors;

(c) an actuator, responsive to a control signal, for actuating the head radially over the disk;

(d) a position error generator responsive to the servo data read from the embedded servo sectors, the position error generator for generating a position error signal representing a position of the read element with respect to a circumferential path along a selected one of the tracks;

(e) a plurality of read repeatable runout (RRO) estimated values and a plurality of write RRO estimated values;

(f) a means for combining the position error signal with the read RRO estimated values to generate a corrected position error signal during a read operation, and for combining the position error signal with the write RRO estimated values to generate the corrected position error signal during a write operation; and (g) a servo compensator, responsive to the corrected position error signal, for generating the control signal applied to the actuator, wherein:
the plurality of servo sectors of a track comprise a first interleave and a second interleave;
each servo sector of the first interleave stores the write RRO estimated values corresponding to a plurality of subsequent servo sectors; and
each servo sector of the second interleave stores the read RRO estimated values corresponding to a plurality of subsequent servo sectors.

2. The disk drive as recited in claim 1, wherein:
(a) the servo data stored in a servo sector of a track comprises a plurality of servo bursts; and
(b) each servo burst is written at a predetermined offset from the track's centerline.

3. The disk drive as recited in claim 1, wherein the plurality of read RRO estimated values and the plurality of write RRO estimated values are stored in the servo sectors.

4. A disk drive comprising:
(a) a disk comprising a plurality of tracks, each track comprising a plurality of data sectors for storing user data and a plurality of embedded servo sectors for storing servo data;

(b) a head comprising a read element and a write element, wherein:
the read element is offset from the write element;
the write element for writing user data to the data sectors; and
the read element for reading the user data stored in the data sectors and for reading the servo data stored in the embedded servo sectors; and (c) an actuator for actuating the head radially over the disk, wherein:
the plurality of servo sectors of a track comprise a first interleave and a second interleave;
each servo sector of the first interleave stores write repeatable runout (RRO) estimated values corresponding to a plurality of subsequent servo sectors;
each servo sector of the second interleave stores read RRO estimated values corresponding to a plurality of subsequent servo sectors;
the write RRO estimated values for compensating for an RRO disturbance during a write operation; and
the read RRO estimated values for compensating for an RRO disturbance during a read operation.

* * * * *